June 9, 1942.   A. DRUCKER   2,285,768
LENS MOUNTING
Filed Oct. 11, 1940
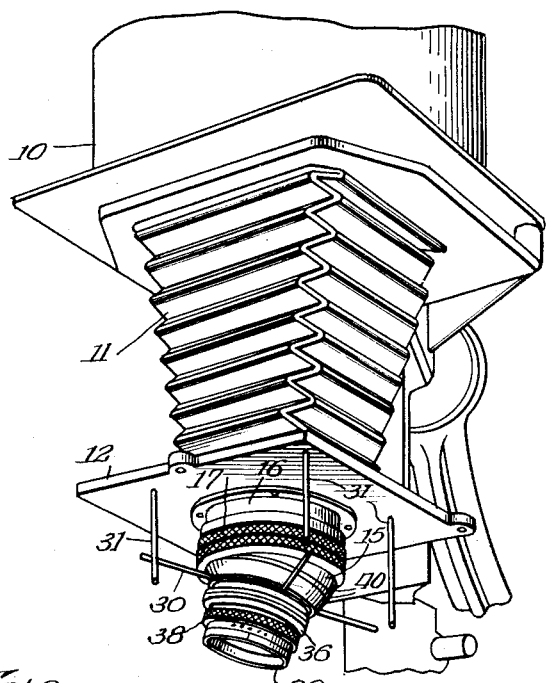
Fig.1
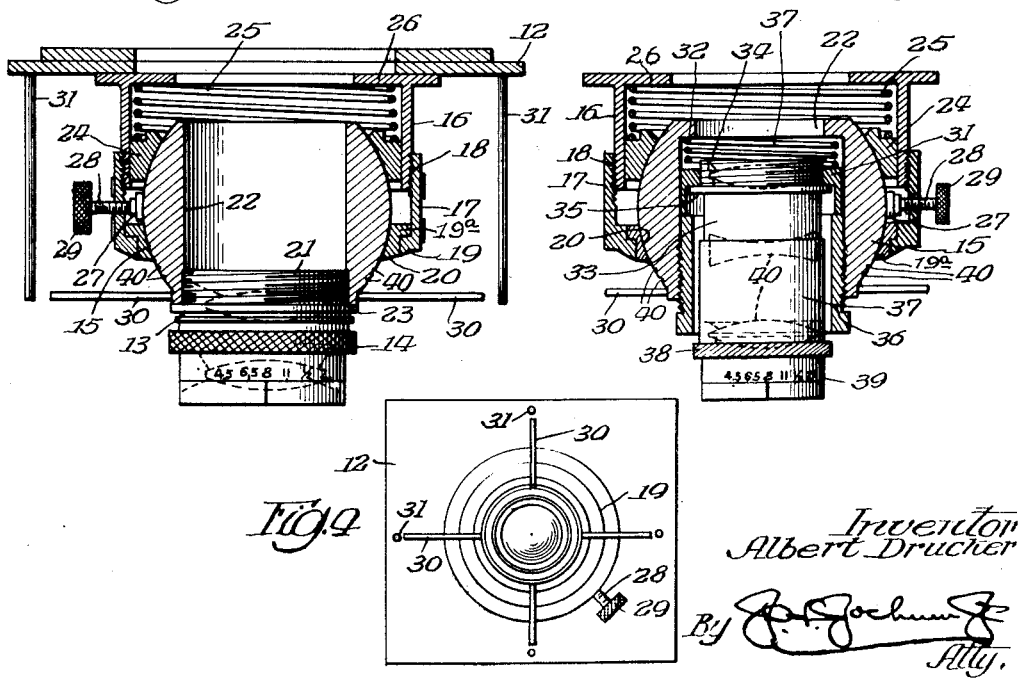
Inventor
Albert Drucker
By [signature]
Atty.

Patented June 9, 1942

2,285,768

UNITED STATES PATENT OFFICE 2,285,768

LENS MOUNTING

Albert Drucker, Chicago, Ill., assignor to Burke & James, Inc., Chicago, Ill., a corporation of Illinois Application October 11, 1940, Serial No. 360,816

8 Claims. (Cl. 88—24)

This invention relates to improvements in lens mounting for photographic enlargers, cameras and the like, and one of the objects of the same in connection with an enlarger, is to permit a variance of the enlarging easel from the parallel plane with respect to the negative plane, to correct the original negative distortions or to create enlargement perspective effects, with the lens opening at a comparatively large diameter.

Its use in connection with cameras is to adjust or correct the optical plane of the lens to coincide with the camera inclinations or tilts.

A further object is to adjust the horizontal as well as the vertical axes of the lens and all axes therebetween without removing the lens from its support.

A further object is to provide improved means to set the lens so that it will maintain a sharp focus at any angle of the objective at a comparatively large aperture opening of the lens, to correct distortions or inaccuracies in a negative from which projection prints are to be made, such as straightening inclined lines and to produce sharpness of lines with comparatively wide open lens.

A further object is to provide improved means for adjustably mounting the lens in a photographic enlarger or camera so that the optical axis of the lens may be set at any desired operating angle with reference to the center of the camera or projector, and improved means for setting the optical center of the lens with respect to the center of the angular displacement means.

A still further object is to provide improved means for indicating angularity of adjustment of the optical center of the lens with reference to the longitudinal adjustment means and which indicating means also serves as a means whereby adjustment of the lens may be effected.

A still further object is to provide improved means for locking the lens in any position to which it has been adjusted with respect to its support.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a portion of a photographic enlarging apparatus having a lens mounting constructed in accordance with the principles of this invention attached thereto.

Figure 2 is a longitudinal sectional view of one form of lens mounting.

Figure 3 is a view similar to Figure 2 of another form of lens mounting.

Figure 4 is a bottom plan view of Figure 3.

Referring more particularly to the drawing, the numeral 10 designates generally a photographic enlarging apparatus which may be of any desired size or configuration or construction and which is provided with the usual bellows 11. The numeral 12 designates a lens supporting board to which the forward end of the bellows 11 is attached in the usual manner.

In the form of the invention shown in Figure 2, the numeral 13 designates a lens barrel of any construction and is provided therein with the usual lens elements; the numeral 14 designates a knurled nut or collar by means of which the iris diaphragm within the lens barrel is adjusted.

The lens barrel is connected to the lens support or board 12, in the form of the invention shown in Figure 2, by means of a ball and socket joint, the numeral 15 designating the ball or spherical member of the joint while the other member of the joint preferably comprises a sleeve 16 which is secured to the lens board or support 12, and a sleeve 17 which telescopes over the sleeve 16; and these two sleeves are connected by means of threads 18. The end 19 of the sleeve 17 is annular to provide a seat 20 which encompasses a portion of the spherical member 15. The lens barrel 13 is provided with a threaded extremity 21 which telescopes into an opening 22 that extends through the spherical member 15 and engages threads in the wall of the opening 22.

A shoulder 23 may be provided on the lens barrel which abuts the end of the wall of the opening 22. Arranged within the sleeve 16 is an annular friction creating member 24 which also encompasses a portion of the spherical member 15 and a resilient member 25 preferably in the form of a spring engages the element 24 and also engages and rests against a shoulder 26 in the sleeve 16.

The resilient element 25 tends normally to force the annular member 24 into engagement with the periphery of the spherical or ball member 15 so as to create friction and thereby serve as a means for holding the spherical member 15 and the lens barrel 13 in any position to which they have been adjusted with respect to the sleeves 16—17.

If desired, a locking element 27 for maintaining the parts in their adjusted relation, may be provided on the end of a screw 28, which latter is threaded through the wall of the sleeve 17, and a knurled head 29 may be provided on the screw to facilitate adjustment of the member 27.

As a means for indicating the angularity of adjustment of the spherical or ball member 15 with respect to the lens board 12, any suitable means may be provided such as pins 30 which co-operate with pins or projections 31 connected with the lens board or support 12, or if desired circular lines or marks 40 may be employed on the element 15 for that purpose.

These pins 30 will also serve as a means whereby the angular adjustment of the spherical or ball member 15 may be obtained.

In the form of the invention shown in Figure 3 there is provided in the opening 22 in the spherical member 15 a freely slidable sleeve 31 which is of a diameter to contact the wall of the opening 22 and is itself of an annular configuration being provided with screw threads 32 in the wall of its opening. The lens barrel 33 is provided with a threaded extremity 34 adapted to engage the threads 32 in the sleeve 31, the lens barrel being provided with a shoulder 35 adapted to engage the sleeve 31.

A second sleeve 36 provided with external screw threads 37 telescopes into the opening 22 of the spherical member 15 and engages threads in the wall of the opening 22. The end of the sleeve 36 abuts the sleeve 31 and a resilient member 37 preferably in the form of a spring, tends normally to hold the sleeve 31 against the end of the sleeve 36.

The forward end of the sleeve 36 projects beyond the periphery of the spherical member 15 and may be provided with a knurled collar 38 by means of which the usual diaphragm in the member 39 of the lens unit may be adjusted. The lens barrel 33 is provided with the usual lens elements 40.

In order to effect a longitudinal adjustment of the lens barrel 33 with respect to the spherical element 15, the sleeve 36 may be adjusted and if turned clockwise the sleeve 31, which slides loosely in the opening 22 of the element 15, will be forced inwardly against the stress of the spring 37. If the sleeve 36 is turned anti-clockwise then the stress of the spring 37 will cause the sleeve 31 to move with the sleeve 36 so that the sleeve 31 will be maintained in abutment with the end of the sleeve 36.

With this improved construction it will be manifest that by reason of the ball and socket connection between the lens barrel and the lens board a universal adjustment of the lens barrel may be obtained.

In the form of the invention shown in Figure 3 it will be manifest that there is provided a set of adjustable sleeves within the spherical or ball member 15 so that the lens barrel may be also adjusted longitudinally within the spherical or ball member 15 to place the optical center or axis of the lens in the physical center of the ball or spherical element 15 or in any other relative position required, in any position to which the lens barrel has been adjusted by the adjustment of the spherical member 15 with respect to the lens board or support 12.

While the preferred forms of the invention have been herein shown and described, it is to be understood that various changes may be made in the details of construction and in the combination and arrangement of the several parts within the scope of the claims, without departing from the spirit of this invention.

What is claimed as new is:

1. In a lens mounting the combination of a lens support, a lens carrying member, a ball and socket joint between said lens and said lens support, adapting said lens for universal adjustment with respect to said support, resilient friction creating means housed within the mounting and operating with a uniform pressure upon a zone encompassing one of the elements of said joint, and means whereby the tension of said friction creating means may be varied at will.

2. In a lens mounting, a lens support, a universal swiveling unit one member of which is anchored to said support, the other member of said unit having an opening extending through the periphery thereof, an annular member slidably mounted in said opening, a lens barrel secured to said slidable member, a sleeve disposed between the periphery of said lens barrel and the wall of said opening and engaging said annular member for holding the latter in position and for effecting adjustment of said annular member and lens barrel with respect to the said other member, and resilient means housed within the mounting and operating upon the said other member for frictionally maintaining the latter in any position to which it has been moved.

3. In a lens mounting, a lens support, a universal swiveling unit one member of which is anchored to said support, the other member of said unit having an opening extending through the periphery thereof, an annular member slidably mounted in said opening, a lens barrel secured to said slidable member, a sleeve disposed between the periphery of said lens barrel and the wall of said opening and engaging said annular member for holding the latter in position and for effecting adjustment of said annular member and lens barrel with respect to the said other member, and resilient means housed within the mounting and tending normally to move said annular member in one direction and against the stress of which resilient means said annular member is adapted to be adjusted by said sleeve.

4. In a lens mounting, a lens support, a universal swiveling unit one member of which is anchored to said support, the other member of said unit having an opening extending through the periphery thereof, an annular member slidably mounted in said opening, a lens barrel secured to said slidable member, a sleeve disposed between the periphery of said lens barrel and the wall of said opening and engaging said annular member for holding the latter in position and for effecting adjustment of said annular member and lens barrel with respect to the said other member, and resilient means housed within the mounting and operating upon the said other member for frictionally maintaining the latter in any position to which it has been moved, said resilient means embodying an annular member encompassing a portion of the said other member, and a spring exerting its stress upon the last said annular member.

5. In a lens mounting the combination of a lens support, a universal swiveling unit, one member of which is secured to said support, a lens barrel telescoping into the other member of said unit for longitudinal adjustment with respect thereto, means for anchoring one end of said barrel to the last said member of said unit, means for effecting a longitudinal adjustment of said lens barrel with respect to said unit, whereby to position the optical center of the lens with reference to the physical center of the last said unit member at will, in any position to which the said lens barrel has been positioned by a relative adjustment of the member of said unit, and means for indicating the angularity of adjustment of the optical axis of the lens with reference to the longitudinal adjustment means for the lens.

6. In a lens mounting the combination of a lens support, a universal swiveling unit one member of which is secured to said support, a lens barrel telescoping into the other member of said unit for longitudinal adjustment with respect thereto, means for anchoring one end of said barrel to the last said member of said unit, means for effecting a longitudinal adjustment of said lens barrel with respect to said unit, whereby to position the optical center of the lens with reference to the physical center of the last said unit member, in any position to which the said lens barrel has been positioned by a relative adjustment of the members of said unit, and means for indicating the angularity of adjustment of the optical axis of the lens with reference to the longitudinal adjustment means for the lens, the last said means also serving as a means whereby adjustment of the lens may be effected.

7. In a lens mounting a lens support, a lens barrel, a universal swiveling unit one member of which is anchored to said support, and means connecting the said lens barrel to the other member of said unit whereby said lens barrel is adapted for universal adjustment with respect to said support, said means embodying a plurality of adjustable sleeves supported by said other member whereby said lens barrel may be longitudinally adjusted with respect to the first said unit member to position the optical center of the lens with reference to the physical center of the last said unit member.

8. In a lens mounting a lens support, a lens barrel, a universal swiveling unit one member of which is anchored to said support, and means connecting the said lens barrel to the other member of said unit whereby said lens barrel is adapted for universal adjustment with respect to said support, said means embodying a plurality of adjustable sleeves supported by said other member, whereby said lens barrel may be longitudinally adjusted with respect to the first said unit member to position the optical center of the lens with reference to the physical center of the last said unit member in any angular position to which the lens barrel has been moved by the last said unit member.

ALBERT DRUCKER.